United States Patent
Koskimies (10) Patent No.: US 10,579,136 B2
(45) Date of Patent: Mar. 3, 2020

(54) USER TRACKING FOR USE IN VIRTUAL REALITY

(71) Applicant: Nokia Technologies Oy, Espoo (FI)

(72) Inventor: Olli Oskari Koskimies, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/313,543

(22) PCT Filed: Jun. 14, 2017

(86) PCT No.: PCT/FI2017/050443
§ 371 (c)(1),
(2) Date: Dec. 27, 2018

(87) PCT Pub. No.: WO2018/002422
PCT Pub. Date: Jan. 4, 2018

(65) Prior Publication Data
US 2019/0258312 A1    Aug. 22, 2019

(30) Foreign Application Priority Data
Jun. 30, 2016 (GB) .................... 1611431.6

(51) Int. Cl.
*G06F 3/01* (2006.01)
*G06F 3/03* (2006.01)
(Continued)

(52) U.S. Cl.
CPC ............ *G06F 3/011* (2013.01); *G06F 3/01* (2013.01); *G06F 3/0304* (2013.01); *G06F 3/038* (2013.01);
(Continued)

(58) Field of Classification Search
CPC combination set(s) only.
See application file for complete search history.

(56) References Cited

U.S. PATENT DOCUMENTS

| 6,674,877 B1 | 1/2004 | Jojic et al. |
| 8,139,067 B2 | 3/2012 | Anguelov et al. |

(Continued)

OTHER PUBLICATIONS

"Inverse Kinematics", Wikipedia, Retrieved on Dec. 15, 2018, Webpage available at : https://en.wikipedia.org/wiki/Inverse_kinematics.
(Continued)

*Primary Examiner* — Robert J Michaud
(74) *Attorney, Agent, or Firm* — Nokia Technologies Oy (57) ABSTRACT

This specification relates to a method and apparatus for receiving user tracking data from a user tracking system, the user tracking data comprising at least one tracking parameter relating to a user position; determining whether one or more tracking parameters are missing; in response to determining that one or more tracking parameters are missing, sending a request to a server for a prediction model for estimating the one or more missing tracking parameters; receiving the prediction model from the server; and calculating an estimated position in respect of each of the one or more missing tracking parameters based on the received prediction model. This specification also relates to a method and apparatus for receiving, from a first application, a request for a prediction model for at least one of a plurality of tracking parameters, the request indicating that at least one tracking parameter of user movement tracking data is missing, retrieving a prediction model corresponding to the request; and sending the prediction model to the first application.

20 Claims, 8 Drawing Sheets

(51) Int. Cl.
| | |
|---|---|
| *G06N 3/08* | (2006.01) |
| *G06T 15/00* | (2011.01) |
| *G06T 7/246* | (2017.01) |
| *G06F 3/038* | (2013.01) |
| *G06N 3/04* | (2006.01) |

(52) U.S. Cl.
CPC ............... *G06N 3/08* (2013.01); *G06T 7/251* (2017.01); *G06T 15/005* (2013.01); *G06N 3/0445* (2013.01); *G06T 2207/20081* (2013.01); *G06T 2207/30196* (2013.01)

(56) References Cited

U.S. PATENT DOCUMENTS

| | | |
|---|---|---|
| 2009/0221374 A1 | 9/2009 | Yen et al. |
| 2014/0098018 A1 | 4/2014 | Kim et al. |
| 2016/0049005 A1 | 2/2016 | Mullins et al. |
| 2016/0260251 A1 | 9/2016 | Stafford et al. |
| 2017/0289219 A1* | 10/2017 | Khalid ................ H04L 65/4084 |
| 2019/0030397 A1* | 1/2019 | Hall ....................... G11B 27/00 |

OTHER PUBLICATIONS

"How to Calculate Inverse Kinematics [closed]", Stackoverflow, Retrieved on Dec. 15, 2018, Webpage available at : https://stackoverflow.com/questions/3518130/how-to-calculate-inverse-kinematics.

Tang et al., "A Real-Time Hand Posture Recognition System Using Deep Neural Networks", ACM Transactions on Intelligent Systems and Technology (TIST)—Special Section on Visual Understanding with RGB-D Sensors, vol. 6, No. 2, May 2015, pp. 1-23.

Zhuang et al., "Video Motion Capture Using Feature Tracking and Skeleton Reconstruction", Proceedings 1999 International Conference on Image Processing (Cat. 99CH36348), Oct. 24-28, 1999, 5 pages.

"PCL Developers Blog", Pointclouds, Retrieved on Dec. 15, 2018, Webpage available at : http://www.pointclouds.org/blog/gsoc14/aroitberg/index.php.

"Detecting People and Their Poses Using PointCloudLibrary", Pointclouds, Retrieved on Dec. 15, 2018, Webpage available at : http://pointclouds.org/documentation/tutorials/gpu_people.php.

"Detecting People on a Ground Plane with RGB-D data", Pointclouds, Retrieved on Dec. 15, 2018, Webpage available at : http://pointclouds.org/documentation/tutorials/ground_based_rgbdpeople_detection.php.

"Tracking Users with Kinect SkeletalTracking", Msdn.microsoft, Retrieved on Dec. 15, 2018, Webpage available at : https://msdn.microsoft.com/en-us/library/jj131025.aspx.

"Skeleton Members", Msdn.microsoft, Retrieved on Dec. 15, 2018, Webpage available at : https://msdn.microsoft.com/en-us/library/microsoft.kinect.skeleton_members.aspx.

Search Report received for corresponding United Kingdom Patent Application No. 1611431.6, dated Dec. 20, 2016, 4 pages.

International Search Report and Written Opinion received for corresponding Patent Cooperation Treaty Application No. PCT/FI2017/050443, dated Nov. 17, 2017, 19 pages.

Kukar et al., "Reliable Classifications with Machine Learning", European Conference on Machine Learning (ECML), 2002, pp. 219-231.

Dib et al., "Pose Estimation for a Partially Observable HumanBody From RGB-D Cameras", IEEE/RJS International Conference on Intelligent Robots and Systems(IROS), Sep. 28-Oct. 2, 2015, 8 pages.

Barros et al., "Real-Time Human Pose Estimation from Body-Scanned Point Clouds", International Conference on Computer Vision Theory and Applications (VISAPP), Mar. 2015, 8 pages.

\* cited by examiner

USER TRACKING FOR USE IN VIRTUAL REALITY

RELATED APPLICATION

This application was originally filed as Patent Cooperation Treaty Application No. PCT/FI2017/050443 filed Jun. 14, 2017 which claims priority benefit to GB Patent Application No. 1611431.6, filed Jun. 30, 2016.

FIELD

This specification relates generally to a method and system for tracking a user for rendering in a virtual reality environment.

BACKGROUND

Virtual reality (VR) is an immersive form of multimedia which involves displaying a virtual world within a user device, which is typically a headset worn by the user which has two screens (one for each eye) displaying part of the virtual world dependent on the position and/or orientation of the user detected using sensors. Headphones are also usually provided in the headset providing audio and thereby augmenting the virtual experience. The virtual world may be computer generated from a real world space captured using a suitable camera system comprising multiple camera sensors oriented in respective directions, typically capturing a 360 degree view field. Nokia's OZO® camera is one such device, providing both spatial video and audio signals for processing and rendering using suitable virtual reality software on a computer system.

Users may be equipped with tracking sensors or markers to track body movements in the real world in order to render the user in the virtual world. Different tracking systems track user positions to different levels of accuracy. Embodiments of the invention reconcile issues arising from the use of different tracking systems.

SUMMARY

In a first aspect, this specification describes a method comprising receiving user tracking data from a user tracking system, the user tracking data comprising at least one tracking parameter relating to a user position; determining whether one or more tracking parameters are missing; in response to determining that one or more tracking parameters are missing, sending a request to a server for a prediction model for estimating the one or more missing tracking parameters; receiving the prediction model from the server; and calculating an estimated position in respect of each of the one or more missing tracking parameters based on the received prediction model.

The method may further comprise calculating a user position in virtual space using the or each estimated position for the respective one or more missing tracking parameters and the received tracking data.

The method may further comprise rendering the user in virtual space using the calculated user position.

The method may further comprise sending the received tracking data to the server.

The received tracking data may be sent to the server in response to a determination that the number of received tracking parameters is above a minimum tracking parameter threshold.

The request may comprise an application identifier.

The request may indicate at least one of: an identifier of the missing tracking parameter, the number of missing tracking parameters.

The request may comprise user demographic data.

The user demographic data may comprise information regarding at least one of weight, age or sex of the user.

The plurality of tracking parameters may correspond to a plurality of body locations.

The prediction model may comprise an inverse kinetics model or a machine learning model.

The prediction model may be selected from a plurality of prediction models using a reliability factor.

In a second aspect, this specification describes a method comprising receiving, from a first application, a request for a prediction model for at least one of a plurality of tracking parameters, the request indicating that at least one tracking parameter of user movement tracking data is missing, retrieving a prediction model corresponding to the request; and sending the prediction model to the first application.

The method may further comprise receiving, from a second application, user movement tracking data comprising a plurality of tracking parameters relating to a user position; and determining, based on the plurality of received tracking parameters, a prediction model for at least one of the plurality of tracking parameters.

Determining may comprise creating the prediction model or updating the prediction model.

The received user movement tracking data may further comprise an application identifier identifying a virtual reality application associated with the user movement tracking data.

The prediction model may be associated with an application identifier identifying a virtual reality application.

The first and second systems may be the same application or different applications.

The prediction model may be selected based on the at least one missing parameter, the number of missing parameters, and/or the plurality of tracking parameters available to the application.

The request may indicate at least one of: an identifier of the missing tracking parameter, the number of missing tracking parameters.

The request may comprise user demographic data.

The user demographic data may comprise information regarding at least one of weight, age or sex of the user.

The plurality of tracking parameters may correspond to a plurality of body locations.

The prediction model may comprise an inverse kinetics model or a machine learning model.

The prediction model may be selected from a plurality of prediction models using a reliability factor.

In a third aspect, this specification describes a computer-readable storage medium having computer-readable instructions thereon that, when executed by a computing apparatus, cause the apparatus to perform the method according to the first or second aspect of the specification.

In a fourth aspect, this specification describes an apparatus comprising means for receiving user tracking data from a user tracking system, the user tracking data comprising at least one tracking parameter relating to a user position; means for determining whether one or more tracking parameters are missing; means for sending, in response to determining that one or more tracking parameters are missing, a request to a server for a prediction model for estimating the one or more missing tracking parameters; means for receiving the prediction model from the server; and means for calculating an estimated position in respect of each of the one or more missing tracking parameters based on the received prediction model.

In a fifth aspect, this specification describes an apparatus comprising means for receiving, from a first application, a request for a prediction model for at least one of a plurality of tracking parameters, the request indicating that at least one tracking parameter of user movement tracking data is missing, means for retrieving a prediction model corresponding to the request; and means for sending the prediction model to the first application.

In a sixth aspect, this specification describes an apparatus comprising at least one processor; and at least one memory including computer program code, which when executed by the at least one processor, causes the apparatus to: receive user tracking data from a user tracking system, the user tracking data comprising at least one tracking parameter relating to a user position; determine whether one or more tracking parameters are missing; send, in response to determining that one or more tracking parameters are missing, a request to a server for a prediction model for estimating the one or more missing tracking parameters; receive the prediction model from the server; and calculate an estimated position in respect of each of the one or more missing tracking parameters based on the received prediction model.

In a seventh aspect, this specification describes an apparatus comprising at least one processor; and at least one memory including computer program code, which when executed by the at least one processor, causes the apparatus to: receive, from a first application, a request for a prediction model for at least one of a plurality of tracking parameters, the request indicating that at least one tracking parameter of user movement tracking data is missing, retrieve a prediction model corresponding to the request; and send the prediction model to the first application.

BRIEF DESCRIPTION OF THE DRAWINGS

Embodiments will now be described, by way of example only, with reference to the accompanying drawings, in which.

DETAILED DESCRIPTION

Embodiments of the invention provide an application that receives tracking data from a tracking system. If the data is partial, i.e., the user-mounted sensors or markers are not able to provide all parameters relevant for representing the whole user in the VR scene, the application requests a prediction model from a cloud server. The request may include an application ID to get a prediction model adapted for the particular application. The request may also contain user related parameters (for example, sex, age etc.). The application renders the user in the VR scene based on the prediction model and the partial set of tracking data. If an advanced tracking system provides a full set of tracking parameters then no prediction model is required.

In the context of this specification, a virtual space is any computer generated version of a space, for example a captured real world space, in which a user can be immersed through a visual interface device such as a VR headset. The user may be provided with a tracking system so that the user's position can be rendered in the virtual world. This allows the user and other users to experience the user's presence in the virtual world.

Figure 1:
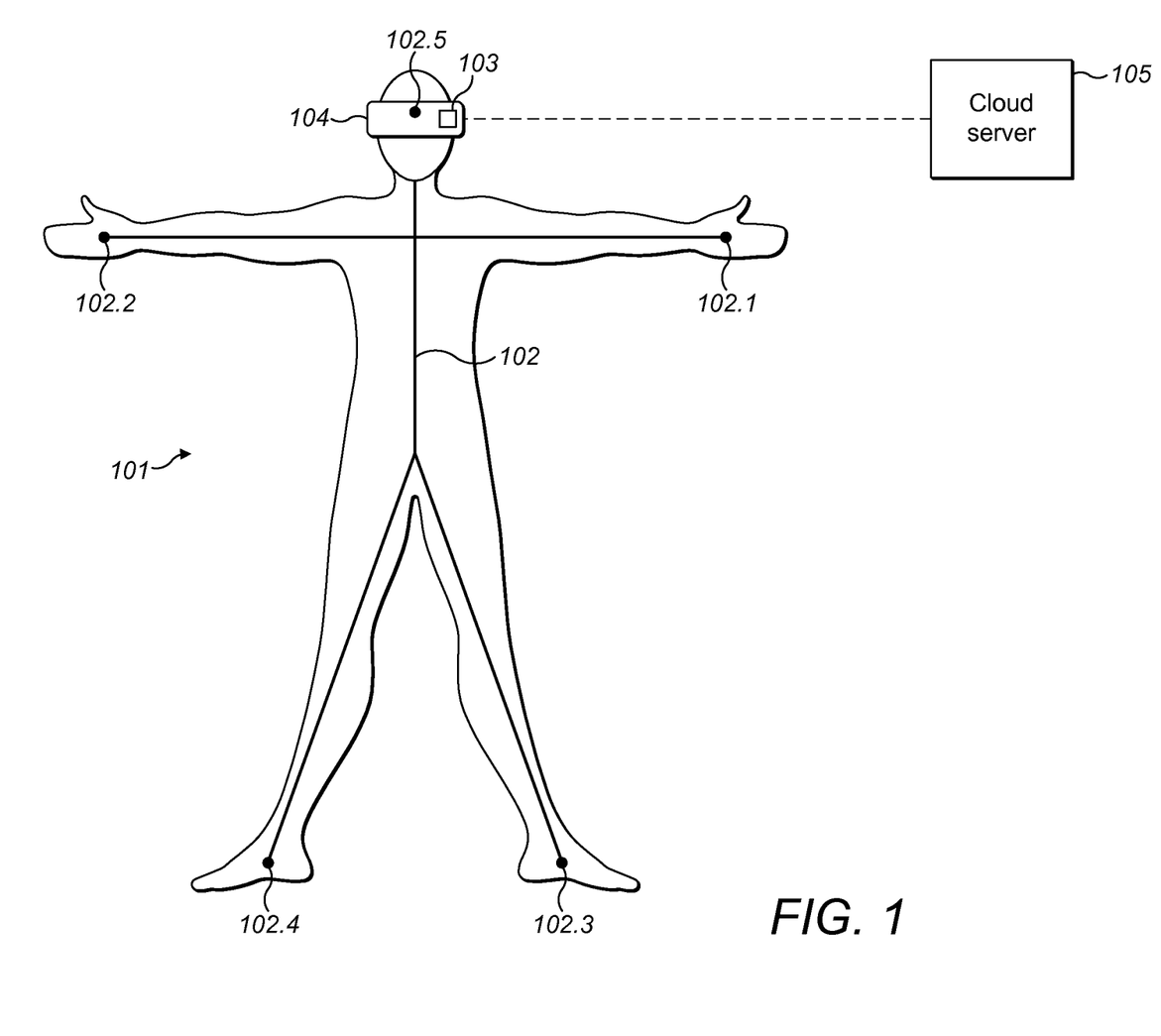
FIG. 1 is an example of a VR system for providing VR content to a user.

FIG. 1 is a schematic illustration of a system 100 for providing VR content for consumption by a user 101 and by other users that may be using the same VR application.

The user 101 is wearing a full-body tracking system 102. The tracking system 102 comprises a plurality of tracking sensors 102-1, 102-2, 102-3, 102-4, 102-5 or markers located at various locations on the user's body. The tracking may be based, for example, on optical tracking, where the position of markers is determined using a camera system. Alternatively, photosensor based tracking may be used where one or more beacons emit light signals that are captured by photosensors. The tracking system 102 is configured to measure user movement tracking data comprising tracking parameters, each tracking parameter corresponding to the location of one of the respective tracking sensors or markers. The tracking data may then be sent from the tracking system 102 to an application 103.

The user 101 is also wearing a VR headset 104. The VR headset 104 may be of any type known in the art. The VR headset 104 may be configured to provide video and audio content to the user 101. The VR headset may be controlled by the application 103. As such, the user 101 may be immersed in virtual space.

In the embodiment shown in FIG. 1, the application 103 is stored in the memory of the VR headset 104. The tracking data may therefore be sent from the tracking system 102 to an application 103 via any suitable wired or wireless link. Examples of a suitable wireless link include a WiFi or Bluetooth link.

In alternative embodiments, a mobile computing device may be attached to the VR headset 104 via a physical link. In such embodiments, the application 103 is stored in the memory of the mobile computing device.

In other embodiments the application 103 may be stored in the memory of any suitable remote computing apparatus such as a desktop computer, a laptop computer, a tablet computer, a mobile device or a games console. In such embodiments, tracking data may be communicated via a wireless link such as a WiFi or Bluetooth connection.

The application 103 is configured to communicate with a server 105. The server 105 may be a cloud server. The application 103 may communicate with the server 105 over a wireless or wired link and may include an internet connection.

In the example shown in FIG. 1, the tracking system 102 is a full body tracking system. The tracking data comprising tracking parameters obtained from each of the sensors or markers is sent to the server 105. The tracking data may then be used to create a prediction model or to update an existing prediction model. A prediction model may be formed for each of several VR applications. The prediction model may be formed using an appropriate machine learning algorithm, for example, a deep learning algorithm such as Long Short Term Memory (LSTM) recursive neural network may be used. Each prediction model may be built up over time as more users having a full-body tracking system contribute tracking data to the server 105. The machine learning algorithm and prediction models may be stored at the server 105.

The tracking data submitted by each user tracking system 102 may be associated with a user account. Each user account may have a user profile containing user demographic data such as gender, age, height, weight and so forth. The user demographic data may be part of the input to the machine learning algorithm. The demographic data relating to the user may be stored at the application 103.

Different users may use different user tracking systems. The various tracking systems may have a different number of tracking sensors or markers. As such, different tracking systems track the position of a different number of points on a user's body.

Embodiments of the invention use a skeletal tracking system, i.e. the user is represented as a skeleton (or stick figure). If the skeleton model is detailed enough (e.g. if it can model individual fingers), it can be used to present the position data from any kind of user tracking system, although the skeleton position might not be entirely accurate if the tracking system provides only partial data. For example, if the tracking system does not provide finger tracking data, the skeletal model may model the fingers in a default position. The skeletal model may also include metadata that indicates that finger tracking is not available. If the user is holding hand controllers, the default finger position may be a gripping position.

Figure 2A:
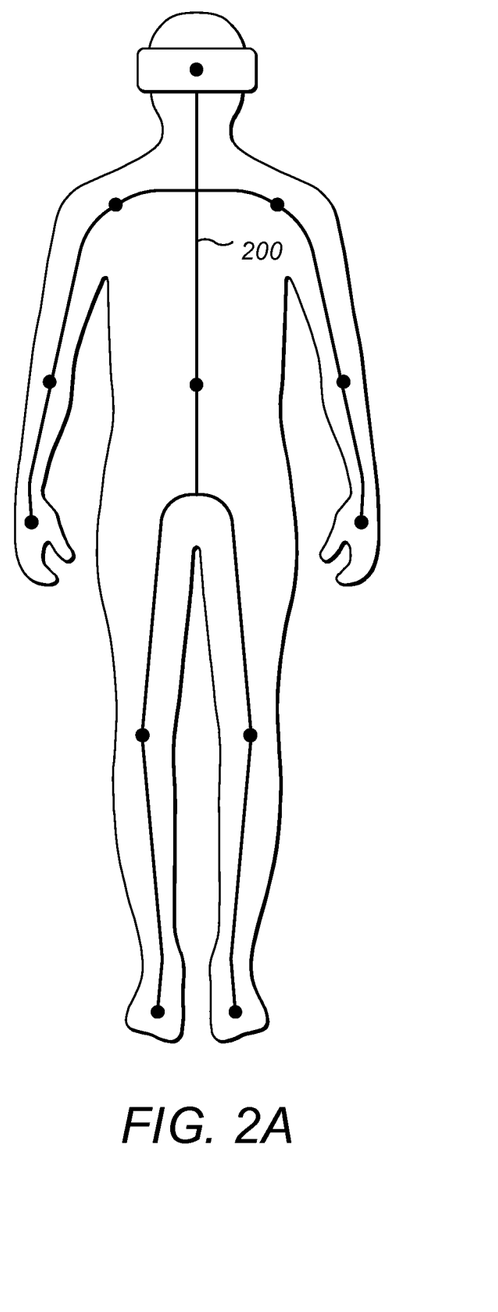
FIGS. 2A, 2B and 2C illustrate tracking sensors or markers in examples of advanced, intermediate and basic tracking systems respectively.

FIG. 2A shows a user wearing an advanced skeletal tracking system 200 which may be substantially the same as the tracking system 102 shown in FIG. 1. One example of an advanced skeletal tracking system is the Microsoft Kinect™ system. The advanced skeletal tracking system comprises sensors or markers on the user's head (for example, in the VR headset 104), shoulders, elbows, hands, knees and feet. Tracking parameters are therefore available from each of these body parts.

Because of cost differences and requirements for interoperability, there is a need for the VR system to be able to interact with VR tracking systems that do not provide full body tracking. In other words, the same VR application may have users with different types of tracking systems.

In the future it is expected that more points of the user body will be tracked in VR systems. For example, a vest might be worn that contains both tracking points and a battery pack that is connected via leads to elbow and knee protectors that have further tracking points, or gloves and shoes with tracking points. This would allow accurate skeletal tracking of the user. However, this type of setup may be expensive and therefore it would co-exist with less expensive setups that have fewer tracking points.

Figure 2B:
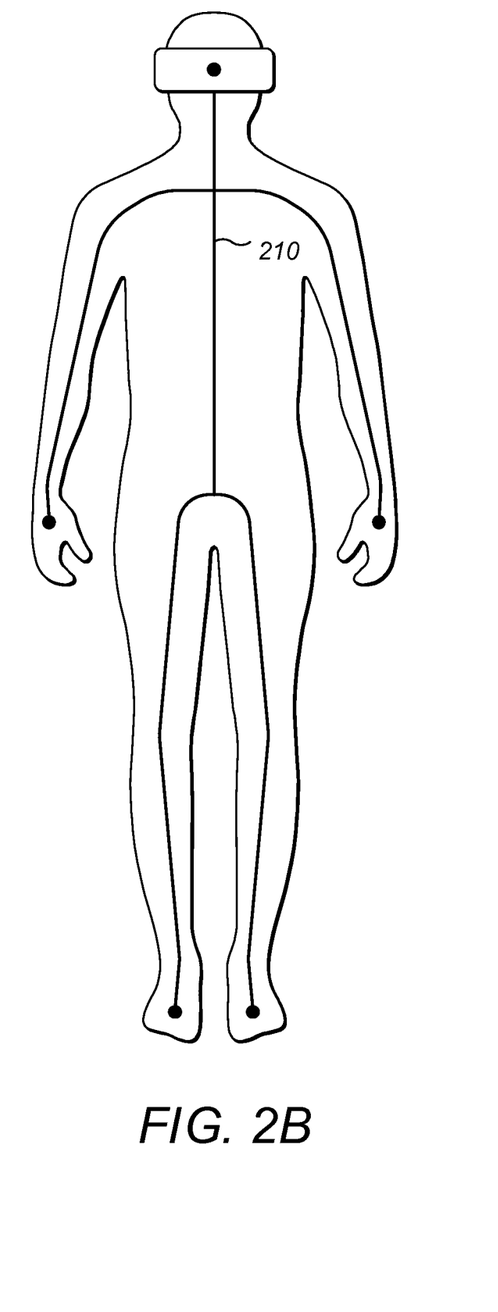

FIG. 2B shows a user wearing an intermediate skeletal tracking system 210. The intermediate skeletal tracking system comprises sensors or markers located at the user's hands and feet as well as a sensor or marker in the VR headset 104. Tracking parameters are therefore only available from the user's head, hands and feet.

Figure 2C:
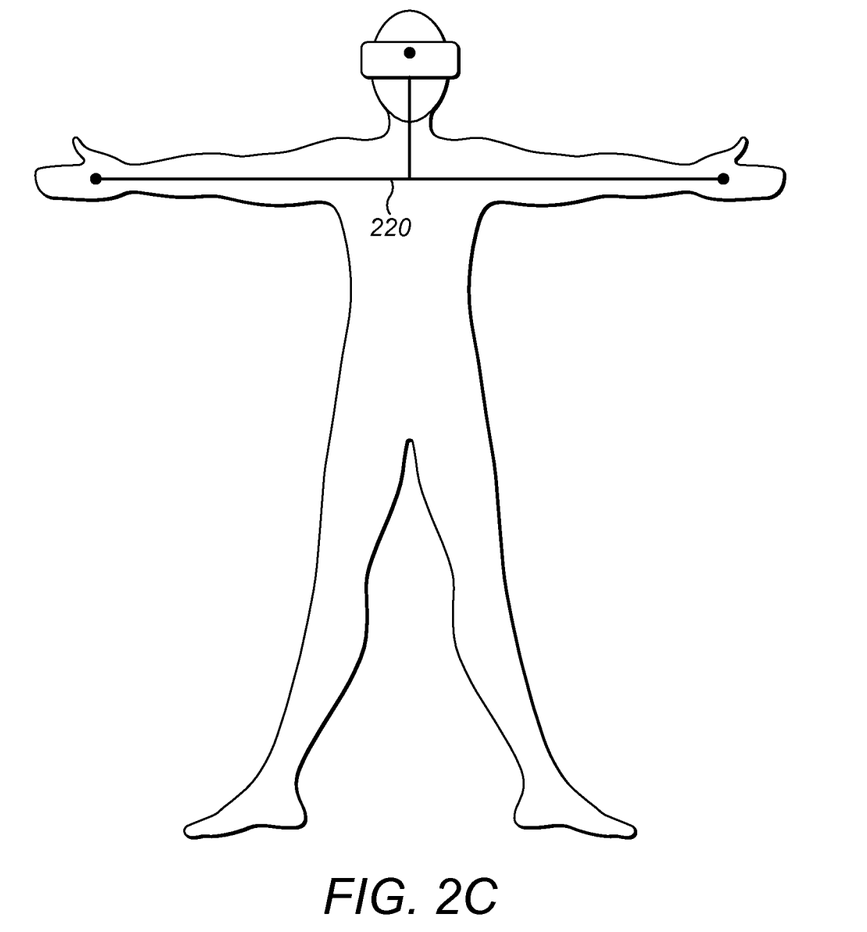

FIG. 2C shows a user wearing a basic skeletal tracking system 220. Sensors or markers are provided in the VR headset 204 and at the user's hands only, for example in hand controllers held by the user. Therefore, tracking parameters from the basic skeletal tracking system 220 relate only to the positions of the VR headset 104 and the user's hands.

While the basic skeletal tracking system 220 is used widely in VR environments, this is not sufficient to accurately portray a representation of the user in VR. For example, the positioning of the user's feet and the exact positioning of the user's arms are unknown. Hence the user is often rendered in virtual space as two disembodied hands (or just the tools that the user is holding), which breaks immersion.

It should be understood that the advanced, intermediate and basic skeletal tracking systems are exemplary embodiments. Other tracking systems may use a different number of sensors or markers to provide tracking parameters from any number of different parts of the user's body.

In embodiments of the invention, the set of tracking points in advanced systems may be a superset of the tracking points in intermediate and basic systems, therefore the tracking data from the advanced systems is input to the machine learning algorithm to improve the predictive skeletal tracking used in less advanced systems. If information is available on what VR application is being used and on user demographic information such as age and sex, the model may be fine-tuned to match the typical movement patterns of the application and user type.

For example, first person shooters may have typical idiomatic movement patterns. Furthermore, children might move slightly differently than adults. In this way, the prediction models will constantly improve as users with advanced systems provide more data and the predictive model learns to predict better. Furthermore, the predictions may adapt to new applications which introduce new movement patterns.

This has the advantage that application developers do not require any knowledge of likely user movements. Instead, new applications can make use of the existing prediction model.

An application may provide to the skeletal tracking system an application ID and user demographic information in order to improve the prediction results. Providing an application ID is advantageous because it improves predictions for the application. Moreover, it also serves the purpose of improving the overall predictive model of the system.

At the server 105, application-specific prediction models may be stored. The correct prediction model may be accessed by sending a request to the cloud server containing the application ID. The tracking data from users who have advanced body tracking systems may be anonymized and uploaded to the server, including the application ID of the application that was used. The server 105 may then use that data to build an application-specific prediction model.

Alternatively, a generic prediction model may be formed. In a generic model, predictive data may be obtained from users of various applications. Such generic models may be based on demographic data obtained from various users. Generic prediction models may also be updated.

The application 103 may then download the application-specific prediction model from the server 105 when the user uses the application. Alternatively, the prediction model may be downloaded in advance in the background. The user benefits from improved prediction accuracy since the prediction model takes the application-specific movement patterns into account. As stated above, the more tracking points the user tracking system 101 has, the more useful the data thus obtained is for building prediction models.

Tracking data may be obtained from any tracking system having a number of sensors or markers above a minimum. For example, an application may define a minimum as the sensors or markers present in a VR headset and two hand controllers.

The predictive models may be built up using a default position for fingers and toes. However, embodiments of the invention may predict unknown tracking positions of intermediate and basic tracking systems based on the recent movements of the user and similar tracking positions obtained from advanced tracking systems. Furthermore, advantage can be taken of the fact that people typically move in certain patterns. For example, hand movement is not independent of foot movement. Such logic may supplement the information obtained from the machine learning algorithm to form a predictive model.

A large amount of tracking data that contains full body tracking data is obtained and then input to the machine learning algorithm (e.g. a deep learning algorithm such as Long Short Term Memory (LSTM) recursive neural network) to create and update a model that predicts the movement of unknown tracking positions based on the known tracking positions. For example, the prediction model may predict the movement of a user's torso and feet based on the movement of head and hands. The accuracy of the prediction may be improved if user demographic data such as age, sex and weight is used in the prediction.

In some embodiments, inverse kinematics may be used, for example in predicting the position of the user's arms, since it would be a simpler algorithm which could potentially be better for constrained devices. However, the machine learning approach may provide better results.

The predictive tracking approach assumes that people use common movement patterns, whereas virtual reality applications, especially games, may cause the user to adopt uncommon movement patterns. For example, particular user postures may be adopted for particular games. Therefore, application specific prediction models may be used.

Figure 3:
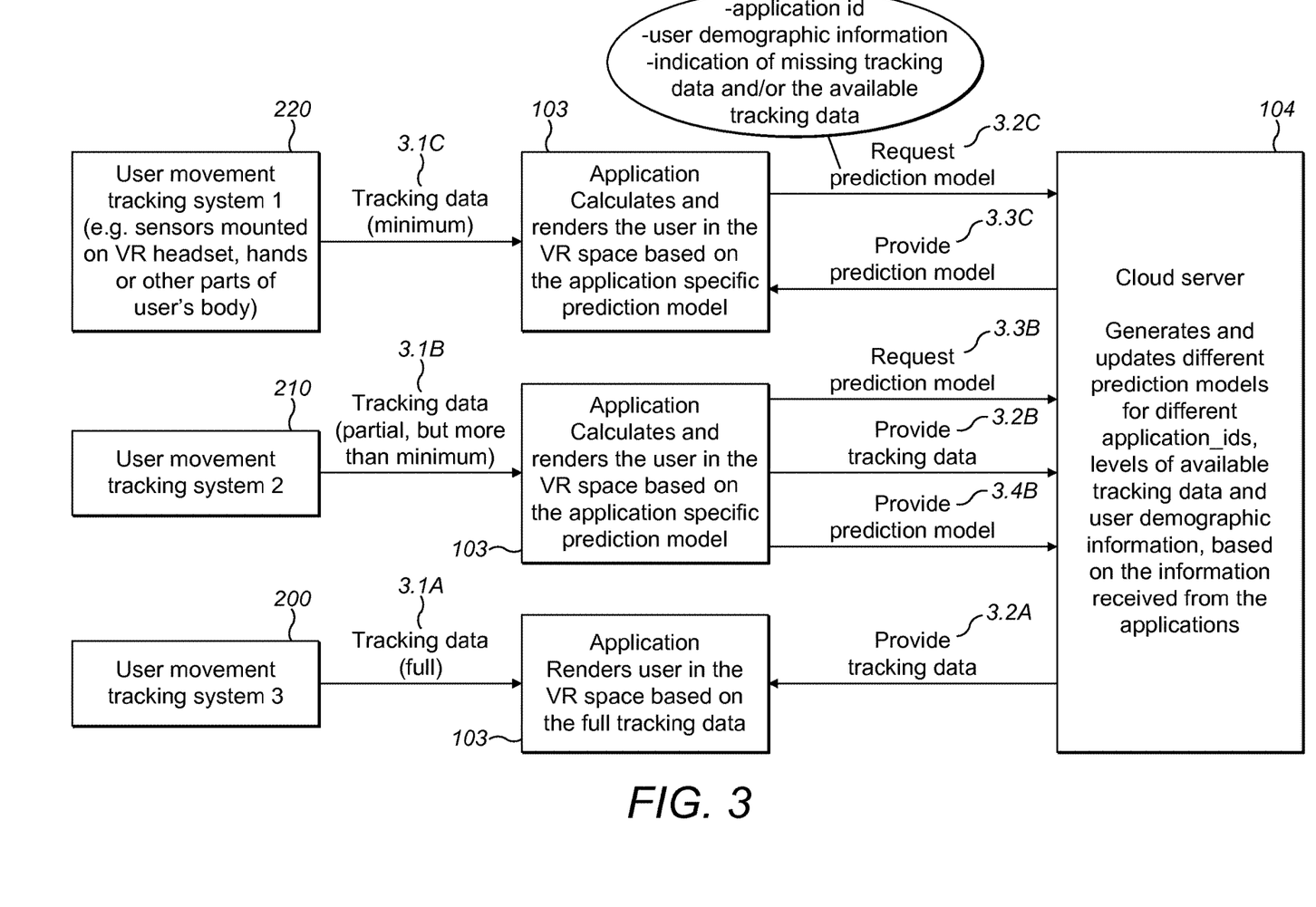
FIG. 3 illustrates the interaction between the tracking systems, the application and the server.
Figure 4:
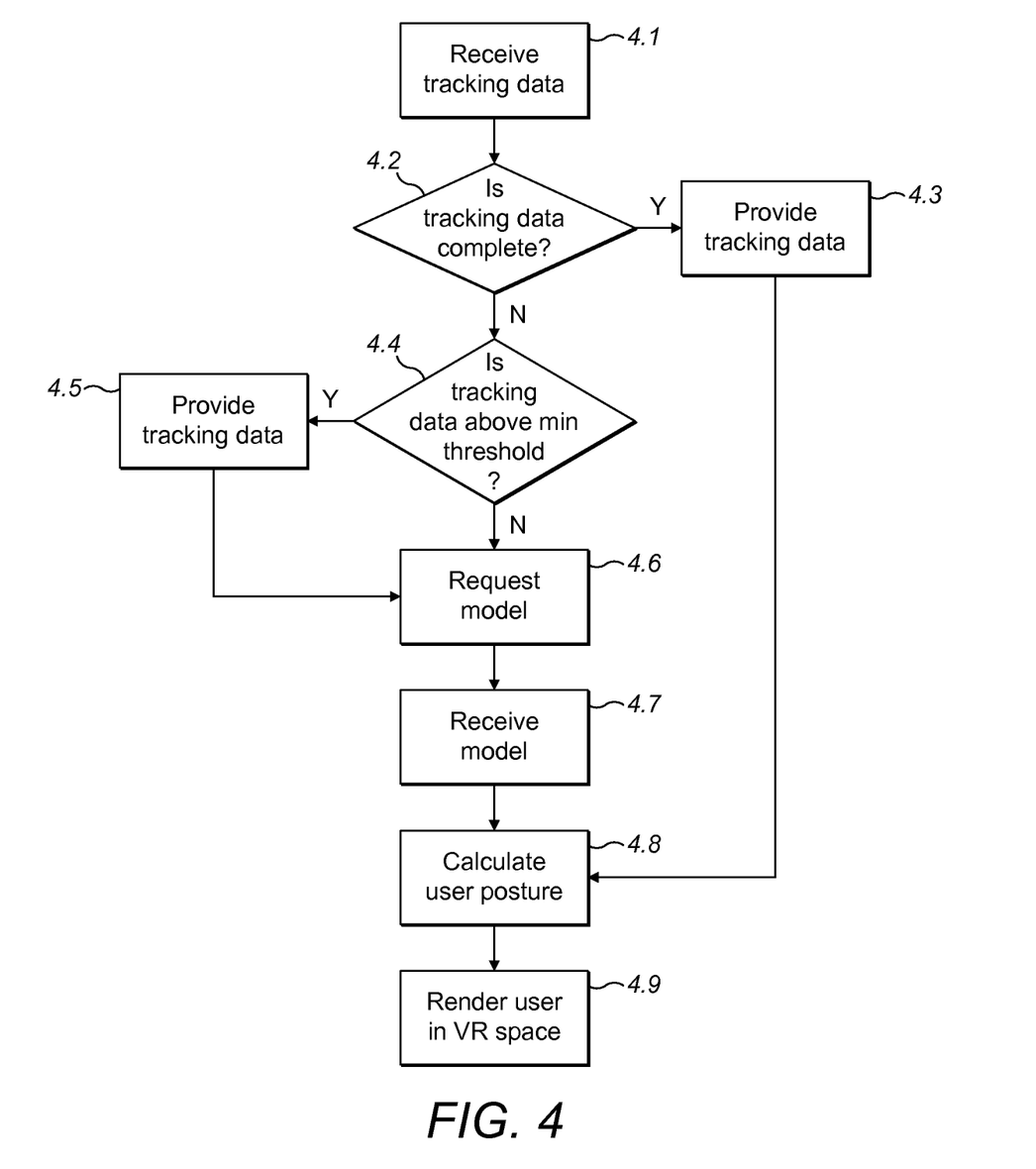
FIG. 4 is a flow chart illustrating operations carried out by the application.

FIG. 3 illustrates the flow of information between the tracking system 102, the application 103 and the server 105 shown in FIG. 1. FIG. 4 illustrates the steps carried out by the application 103.

At step 3.1A, the advanced tracking system 200 provides full tracking data to the application 103. This corresponds to step 4.1 in FIG. 4. The application 103 determines that the tracking data is complete at step 4.2. The tracking data is forwarded to the server 105 at step 3.2A, which corresponds to step 4.3 in FIG. 4. The tracking data may be forwarded in the same format as received from the advanced tracking system 200 or it may processed, for example filtered, before sending to the server 105. Such processing may improve accuracy of the prediction model and/or reduce complexity of the prediction model generation at server 105. The server 105 then either creates a prediction model or updates an existing prediction model. The tracking data may be accompanied by metadata relating to an application ID so that an application-specific prediction model may be created or updated. Alternatively, it may be specified in metadata that the tracking data should be used to update a generic prediction model. Furthermore, demographic data may be provided as metadata to accompany the tracking data.

At step 4.8 shown in FIG. 4, the application 103 calculates the user posture using the tracking data obtained from the intermediate tracking system 210. The application 103 then renders the user in VR space at step 4.9.

Referring again to FIG. 3, at step 3.1B, the intermediate tracking system 210 provides tracking data to the application 103. This corresponds to step 4.1. The tracking data comprises tracking parameters from several points on the user body but is not as complete as the tracking data obtained from the advanced tracking system 200, as determined at step 4.2. At step 4.4, the application 103 may determine that the number of tracking parameters is above a minimum threshold for forwarding the tracking data to the server 105.

At step 3.2B (and step 4.5), the tracking data is forwarded to the server 105. The tracking data may be forwarded in the same format as received from the intermediate tracking system 210 or it may processed, for example filtered, before sending to the server 105. Such processing may improve accuracy of the prediction model and/or reduce complexity of the prediction model generation at server 105. The server 105 then either creates a prediction model or updates an existing prediction model.

At step 3.3B (and step 4.6), the application 103 sends a request for a prediction model to the server 105. The request may contain an application ID to identify an application-specific prediction model. Alternatively, the request may specify that the request is for a generic prediction model. The request may contain user demographic data.

At step 3.4B, the server 105 sends the prediction model corresponding to the request to the application 103. The application 103 receives the prediction model at step 4.7. The prediction model corresponding to the request to the application 103 may be a prediction model having an application ID corresponding to the application ID specified in the request.

The prediction model may be selected based on matching demographic data in the request with demographic data of one or more prediction models stored at the server 105.

After receiving the prediction model at step 3.4B, the application 103 calculates the user posture using the tracking data obtained from the intermediate tracking system 210 and from the prediction model received from the server 105, as shown at step 4.8. The application 103 then renders the user in VR space at step 4.9.

At step 3.1C, the basic tracking system 220 provides tracking data to the application 103, which corresponds to step 4.1 in FIG. 4. The application 103 determines that the tracking data is not complete at step 4.2. The application 103 further determines that the tracking data does not contain a sufficient number of tracking parameters to create or update a prediction model at step 4.4. At step 3.2C (and step 4.6), the application 103 requests a prediction model. At step 3.3C, the server 105 provides a prediction model corresponding to the request to the application 103. The application 103 receives the prediction model at step 4.7. The steps 3.2C and 3.3C correspond to steps 3.3B and 3.4B respectively.

The prediction model may be selected based on the number of available or desired tracking parameters. For example, a prediction model provided by server 105 at step 3.3C to complement the tracking data from the basic tracking system 220 may enable the application 103 to predict a partial set of tracking parameters, for example corresponding to the tracking data provided in step 3.1. Hence, the prediction model may be selected to provide a more accurate prediction for a partial set of tracking parameters rather than a less accurate prediction for the full set of tracking parameters. Alternatively, a prediction model provided by server 105 at step 3.3C to complement the tracking data from the basic tracking system 220 may enable the application to predict a full set of tracking parameters, for example corresponding to the tracking data provided at step 3.1A.

The prediction model may also be selected based on the characteristics of the tracking system, such as the type of tracking system or the number of available tracking parameters. For example, when used in a basic tracking system, a prediction model specialized to make predictions based on the tracking data from a basic tracking system may perform better than a prediction model that is meant to be used by both basic and intermediate tracking systems. Similarly, a prediction model specialized to make predictions for an optical tracking system might perform better for such systems than a prediction model that is meant to be used by any type of tracking system.

Selection of the prediction model at server 105 may be based on the characteristics of the prediction model, for example a reliability estimate of the prediction model. Reliability of a prediction model may be estimated for example based on an amount of available tracking data or a numerical error estimate determined by applying the prediction model to a subset of the available full tracking data and comparing the prediction results to the full tracking data.

After receiving the prediction model at step 3.3C, the application 103 calculates the user posture using the tracking data obtained from the basic tracking system 220 and from the prediction model received from the server 105 at step 4.8. The application 103 then renders the user in VR space at step 4.9.

Figure 5:
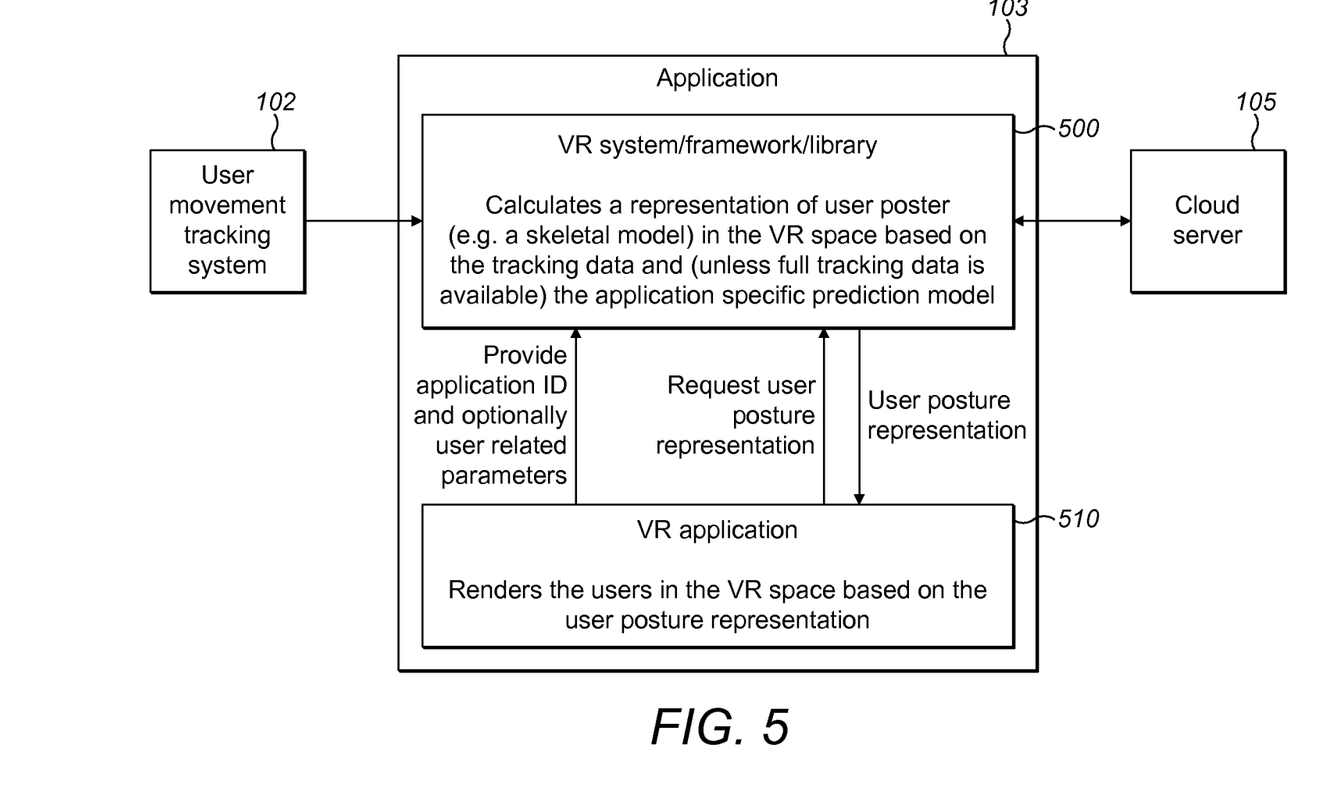
FIG. 5 is a schematic block diagram of the application.

FIG. 5 shows a schematic block diagram of the application 103. The application 103 may comprise a separate VR system (including a framework and library) 500 and VR application 510. The VR system 500 provides tracking data to the VR application 510 through a standardized posture representation (e.g. a skeletal model, similar to the Microsoft Kinect skeletal tracking API).

Figure 6:
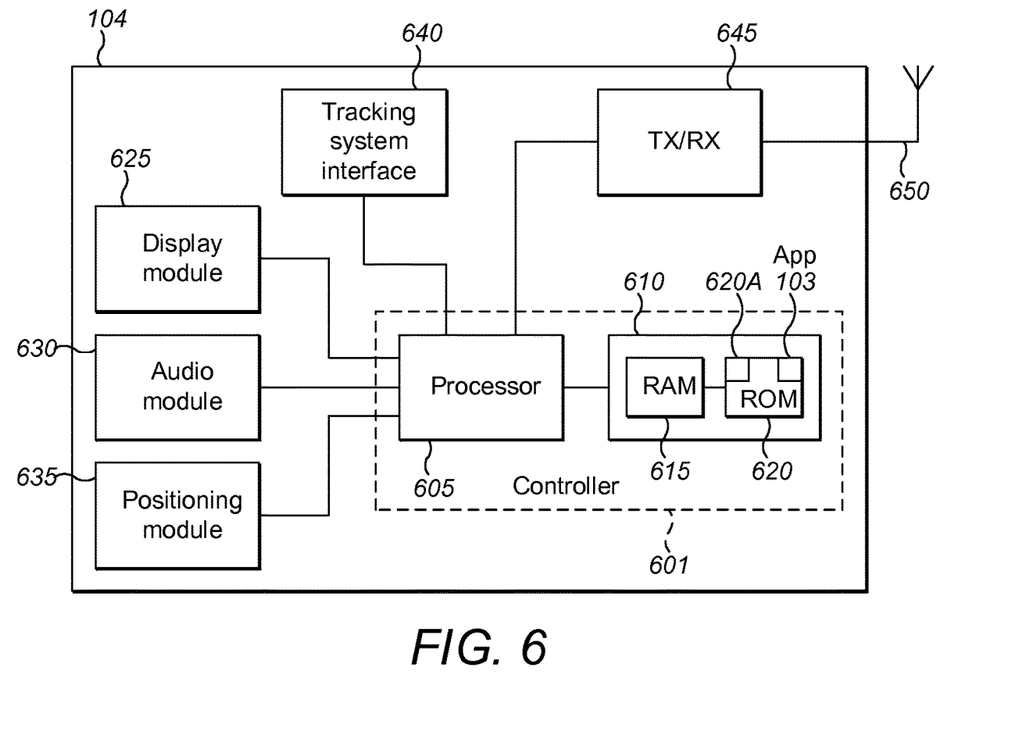
FIG. 6 is a schematic block diagram of a VR headset.

FIG. 6 is a schematic block diagram of the VR headset 104. The VR headset 104 comprises a controller 601. The controller 601 causes the operations of the VR headset 104 to be performed. The controller 601 comprises a processor 605 and a memory 610. The memory 610 may comprise a volatile memory 615 such as random access memory (RAM) and non-volatile memory 620. The non-volatile memory 620 may have computer readable instructions 620A installed thereon. The computer readable instructions 620A may relate to the standard operations carried out by a VR headset. The application 103 is also stored in the non-volatile memory 620.

The VR headset 104 also comprises a display module 625 and an audio module 630 for providing video and audio content to the user, respectively. The VR headset 104 may comprise a positioning module 635 for determining the position of the VR headset 104. The VR headset 104 may comprise a tracking system interface 640 for communicating with the sensors or markers of the tracking system 102 so that tracking data can be processed by the application 103. The VR headset 104 also comprises a transceiver/receiver module 645 and an antenna 650 for communicating wirelessly with the server 105.

Figure 7:
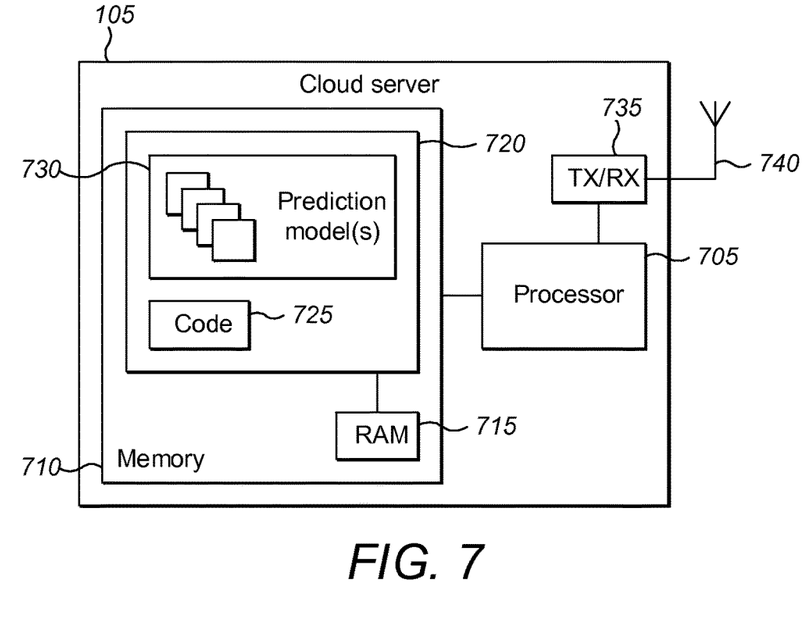
FIG. 7 is a schematic block diagram of a server.

FIG. 7 is a schematic block diagram of the server 105. The server 105 comprises a processor 705 and memory 710. The memory 710 comprises volatile memory 715 such as RAM. The memory 710 comprises non-volatile memory 720. The non-volatile memory 720 has computer readable instructions 725 that allow the server 105 to perform its functionality. The non-volatile memory 720 has a plurality of prediction models 730 stored thereon that may be retrieved by the processor. The server 105 also comprises a transceiver/receiver module 735 and an antenna 740 for communicating with the application 103.

Figure 8:
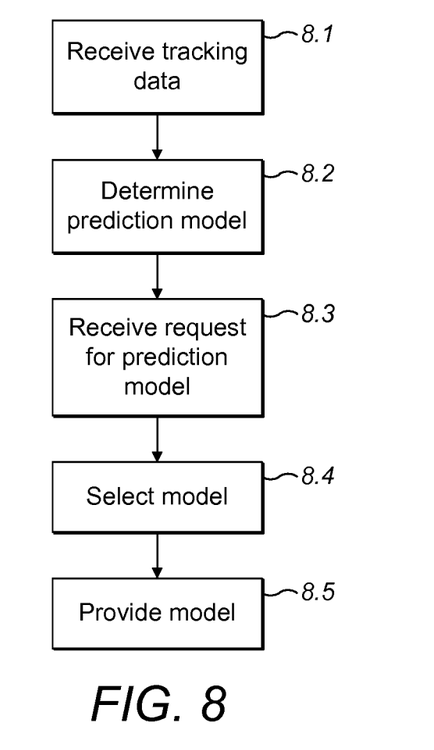
FIG. 8 is flow chart illustrating operations carried out by the server.

FIG. 8 is a flow chart showing the operations carried out by the server 105. At step 8.1, the server 105 receives tracking data sent by the application 103 at steps 4.3 and 4.5 described above with reference to FIG. 4. At step 8.2, the server 105 determines a prediction model. Determining a prediction model may comprise creating a new prediction model or updating an existing prediction model. At step 8.3, the server 105 receives a request for a prediction model that was sent by the application 103 at step 4.6. At step 8.4, the server 104 selects a prediction model to send to the application 103. At step 8.5, the server 104 sends the prediction model to the application 103.

Advantages of embodiments of the invention include the following:
1. The application 103 does not have to manage the prediction models itself.
2. The performance of basic and intermediate tracking systems is improved by enhancing the predictive models used by such systems using the data from advanced tracking systems of other users.
3. The predictive models used by basic and intermediate tracking systems can adapt to the movement patterns characteristic to individual applications.
4. The predictive models used by basic and intermediate tracking systems can adapt to the movement patterns characteristic to user related properties such as age, sex and weight.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined. Similarly, it will also be appreciated that flow diagram of FIG. 4 is an example only and that various operations depicted therein may be omitted, reordered and or combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code, which when executed by the at least one processor, causes the apparatus to:
   receive a user tracking data from a user tracking system, the user tracking data comprising at least one tracking parameter relating to a user position;
   determine whether one or more tracking parameters are missing;
   in response to determining that one or more tracking parameters are missing, send a request to a server for a prediction model for estimating the one or more missing tracking parameters, wherein the request comprises an application identifier;
   receive the prediction model from the server; and
   calculate an estimated position in respect of the one or more missing tracking parameters based on the received prediction model.

2. The apparatus of claim 1, wherein the apparatus is further caused to calculate a user position in virtual space using the estimated position for the respective one or more missing tracking parameters and the received user tracking data.

3. The apparatus of claim 2, wherein the apparatus is further caused to render the user in virtual space using the calculated user position.

4. The apparatus of claim 1, wherein the apparatus is further caused to send the received user tracking data to the server.

5. The apparatus of claim 4, wherein the received user tracking data is sent to the server in response to a determination that the number of received tracking parameters is above a minimum tracking parameter threshold.

6. The apparatus of claim 1, wherein the request indicates at least one of: an identifier of the missing tracking parameter, or the number of missing tracking parameters.

7. The apparatus of claim 1, wherein the request comprises user demographic data.

8. The apparatus of claim 7, wherein the user demographic data comprises information regarding at least one of weight, age, or sex of the user.

9. The apparatus of claim 1, wherein a plurality of tracking parameters correspond to a plurality of locations on the body of the user.

10. The apparatus of claim 1, wherein the prediction model comprises an inverse kinetics model or a machine learning model.

11. The apparatus of claim 1, wherein the prediction model is selected from a plurality of prediction models using a reliability factor.

12. An apparatus comprising:
    at least one processor; and
    at least one memory including computer program code, which when executed by the at least one processor, causes the apparatus to:
    receive, from a first application, a request for a prediction model for at least one of a plurality of tracking parameters, the request indicating that at least one tracking parameter of user movement tracking data is missing and an application identifier identifying the first application associated with the user movement tracking data;
    retrieve a prediction model corresponding to the request, wherein the prediction model is associated with the application identifier identifying the first application; and
    send the prediction model to the first application.

13. The apparatus of claim 12, wherein the apparatus is further caused to:
    receive, from a second application, user movement tracking data comprising a plurality of tracking parameters relating to a user position; and
    determine, based on the plurality of received tracking parameters, a prediction model for at least one of the plurality of tracking parameters.

14. The apparatus of claim 13, wherein the determining comprises creating the prediction model or updating the prediction model.

15. The apparatus of claim 12, wherein the application identifier identifies a virtual reality application.

16. The apparatus of claim 12, wherein the prediction model is selected based on one or more of the at least one missing parameter, the number of missing parameters, or the plurality of tracking parameters available to the first application.

17. A method comprising:
    receiving a user tracking data from a user tracking system, the user tracking data comprising at least one tracking parameter relating to a user position;
    determining whether one or more tracking parameters are missing;
    sending, in response to determining that one or more tracking parameters are missing, a request to a server for a prediction model for estimating the one or more missing tracking parameters, wherein the request comprises an application identifier;
    receiving the prediction model from the server; and
    calculating an estimated position in respect of each of the one or more missing tracking parameters based on the received prediction model.

18. A method comprising:
    receiving, from a first application, a request for a prediction model for at least one of a plurality of tracking parameters, the request indicating that at least one tracking parameter of user movement tracking data is missing and an application identifier identifying the first application associated with the user movement tracking data;

retrieving a prediction model corresponding to the request, wherein the prediction model is associated with the application identifier identifying the first application; and sending the prediction model to the first application.

19. A computer-readable storage medium having computer-readable instructions thereon that, when executed by a computing apparatus, cause the apparatus to perform:

receive a user tracking data from a user tracking system, the user tracking data comprising at least one tracking parameter relating to a user position;

determine whether one or more tracking parameters are missing;

send, in response to determining that one or more tracking parameters are missing, a request to a server for a prediction model for estimating the one or more missing tracking parameters, wherein the request comprises an application identifier;

receive the prediction model from the server; and calculating an estimated position in respect of each of the one or more missing tracking parameters based on the received prediction model.

20. A computer-readable storage medium having computer-readable instructions thereon that, when executed by a computing apparatus, cause the apparatus to perform:

receive, from a first application, a request for a prediction model for at least one of a plurality of tracking parameters, the request indicating that at least one tracking parameter of user movement tracking data is missing and an application identifier identifying the first application associated with the user movement tracking data;

retrieve a prediction model corresponding to the request, wherein the prediction model is associated with the application identifier identifying the first application; and send the prediction model to the first application.

* * * * *